US008520604B2

(12) United States Patent
Bertz et al.

(10) Patent No.: US 8,520,604 B2
(45) Date of Patent: Aug. 27, 2013

(54) METHOD AND SYSTEM FOR CONTROLLING THE PROVISION OF MEDIA CONTENT TO MOBILE STATIONS

(75) Inventors: Lyle T. Bertz, Lee's Summit, MO (US); Ayodeji Abidogun, Overland Park, KS (US); Badri P. Subramanyan, Overland Park, KS (US); Mark A. Lipford, Leawood, KS (US); Charles Brent Hirschman, Overland Park, KS (US)

(73) Assignee: Clearwire IP Holdings LLC, Bellevue, WA (US)

( * ) Notice: Subject to any disclaimer, the term of this patent is extended or adjusted under 35 U.S.C. 154(b) by 0 days.

(21) Appl. No.: 13/549,616

(22) Filed: Jul. 16, 2012

(65) Prior Publication Data

US 2012/0275372 A1 Nov. 1, 2012

Related U.S. Application Data

(62) Division of application No. 12/109,502, filed on Apr. 25, 2008, now Pat. No. 8,248,983.

(51) Int. Cl.
*H04W 4/00* (2009.01)

(52) U.S. Cl.
USPC .......................................... 370/328

(58) Field of Classification Search
None
See application file for complete search history.

(56) References Cited

U.S. PATENT DOCUMENTS

| 6,539,225 | B1 * | 3/2003 | Lee ............................... 455/436 |
| 6,987,764 | B2 | 1/2006 | Hsu |
| 7,397,809 | B2 | 7/2008 | Wang |
| 7,558,587 | B2 | 7/2009 | Albal et al. |
| 7,940,723 | B2 | 5/2011 | Ahmadi |
| 8,046,479 | B2 | 10/2011 | Einarsson et al. |
| 8,248,983 | B2 | 8/2012 | Bertz et al. |
| 2003/0026268 | A1 | 2/2003 | Navas |
| 2004/0010593 | A1 * | 1/2004 | Apostolopoulos et al. ... 709/226 |
| 2004/0236826 | A1 * | 11/2004 | Harville et al. ............... 709/203 |
| 2007/0011503 | A1 | 1/2007 | Kitani et al. |
| 2008/0065724 | A1 * | 3/2008 | Seed et al. .................... 709/203 |
| 2008/0069071 | A1 | 3/2008 | Tang |
| 2008/0253322 | A1 * | 10/2008 | So et al. ........................ 370/329 |
| 2009/0005020 | A1 | 1/2009 | McGowen et al. |
| 2009/0029703 | A1 * | 1/2009 | Turnbull et al. .............. 455/436 |
| 2009/0059832 | A1 | 3/2009 | Jhamnani et al. |

OTHER PUBLICATIONS

Open Mobile Alliance, "Open Mobile Alliance Releases Globally Interoperable Mobile TV Standard," Press Release, Jun. 20, 2007.

(Continued)

*Primary Examiner* — Anh-Vu Ly
(74) *Attorney, Agent, or Firm* — McDonnell Boehnen Hulbert & Berghoff LLP

(57) ABSTRACT

A media service controller controls how one or more base stations transmit media content from one or more media servers to mobile stations. The media service controller may control whether a mobile station receives media content via a unicast or a multicast connection, e.g., based on a predefined schedule and/or on whether other mobile stations served by the same base station are receiving the same media content. The media service controller may provide a content discovery service through which a first media server may determine whether other media servers are providing the same media content. The media service controller may facilitate changing a source of media content received by a mobile station, e.g., by changing the source from a first media server to a second media server when the mobile station moves from an area associated with the first media server to an area associated with the second media server.

19 Claims, 5 Drawing Sheets

(56) References Cited

OTHER PUBLICATIONS

Open Mobile Alliance, "Mobile Broadcase Services Architecture," OMA-AD-BCAST-V1_0-20080226-C, Candidate Version 1.0, Feb. 26, 2008.
Open Mobile Alliance, "Enabler Release Definition for Mobile Broadcase Services," OMA-ERELD-BCAST-V1_0-20080226-C, Candidate Version 1.0, Feb. 26, 2008.
Open Mobile Alliance, "Mobile Broadcast Services Requirements," OMA-RD-BCAST-V1_0-20080226-C, Candidate Version 1.0, Feb. 26, 2008.
H. Schulzrinne et al., "Real Time Streaming Protocol (RTSP)," Network Working Group, Request for Comments 2326, Apr. 1998.
H. Schulzrinne et al., "RTP: A Transport Protocol for Real-Time Applications," Network Working Group, Request for Comments 3550, Jul. 2003.
J. Rey et al., "RTP Retransmission Payload Format," Network Working Group, Request for Comments 4588, Jul. 2006.
T. Einarsson et al., "Multiple aggregated control URIs for RTSP," Network Working Group, Internet-Draft, Dec. 21, 2006.
Q. Xie et al., "Forward-shifted RTP Redundancy Payload Support," Network Working Group, Internet-Draft, Mar. 17, 2008.

* cited by examiner

METHOD AND SYSTEM FOR CONTROLLING THE PROVISION OF MEDIA CONTENT TO MOBILE STATIONS

CROSS-REFERENCE TO RELATED APPLICATIONS

This application is a division of U.S. patent application Ser. No. 12/109,502, filed Apr. 25, 2008, which is incorporated herein by reference.

BACKGROUND

Cellular wireless networks were developed primarily to provide voice communication services to mobile devices. However, wireless service providers have also begun using their cellular wireless networks to provide other types of services, such as providing streaming media content that can be received by and viewed on subscribing mobile devices. Such streaming media content may include audio and/or video, e.g., music selections, movies, or television programming.

Two general approaches have been proposed for providing streaming media content to mobile devices. In one approach, the mobile devices receive streaming media content from terrestrial or satellite broadcasts. For example, the DVB-H and DVB-SH specifications of the Direct Video Broadcasting Project use this approach. However, these streaming media broadcasts typically use a frequency spectrum that is different from that of the cellular wireless network. Thus, a base station in a cellular wireless network may transmit signals for a voice call in one frequency spectrum, while a separate frequency spectrum may be used to broadcast streaming media content to mobile devices. The use of two separate frequency spectra typically results in the mobile device having two separate radios, one radio for receiving transmission from base stations in the cellular wireless network and another radio for receiving streaming media broadcasts. Thus, this approach may require a more complicated mobile device.

In another approach, the streaming media content is transmitted through the cellular wireless network. Thus, a separate frequency spectrum is not needed to provide streaming media content to mobile devices. Instead, the streaming media content typically originates from one or more content servers in a core network and is backhauled through the cellular wireless network to the base stations that can then wirelessly transmit the streaming media content. This means that the resources of the wireless service provider's network are used to provide both voice communication services and streaming media content. Examples of this approach are the Multimedia Broadcast Multicast Service (MBMS) and the Open Mobile Alliance Mobile Broadcast Services Suite (OMA BCAST).

Overview

In accordance with a first principal aspect, an exemplary embodiment provides a method for changing a source of media content received by a mobile station. In accordance with the method, the media content is provided to the mobile station from a first media server via a first base station. The first media server receives an indication of a new location of the mobile station. In response to the indication, the first media sever sends to a media service controller at least one message that identifies the media content and the mobile station. The media service controller determines that a second media server is available to provide the media content to the mobile station. The media service controller instructs a second base station to transmit the media content from the second media server to the mobile station.

In a second principal aspect, an exemplary embodiment provides a method of using a content discovery service. In accordance with the method, a request identifying media content currently being provided in a first stream from a first media server to a mobile station is received. A response is sent to the request. The response identifies a stream of the media content that is currently being provided by a second media server. The mobile station is joined to the second stream so that the mobile station receives the media content from the second media server.

In a third principal aspect, an exemplary embodiment provides a method of controlling how a base station transmits media content to a mobile station. In accordance with the method, the base station transmits the media content to the mobile station via a unicast connection. A media service controller makes a determination that the media content should be multicasted to the mobile station. In response to the determination, the media service controller sends an instruction to the base station. In response to the instruction, the base station transmits the media content to the mobile station via a multicast connection.

DETAILED DESCRIPTION OF EXEMPLARY EMBODIMENTS

1. Introduction

Figure 1:
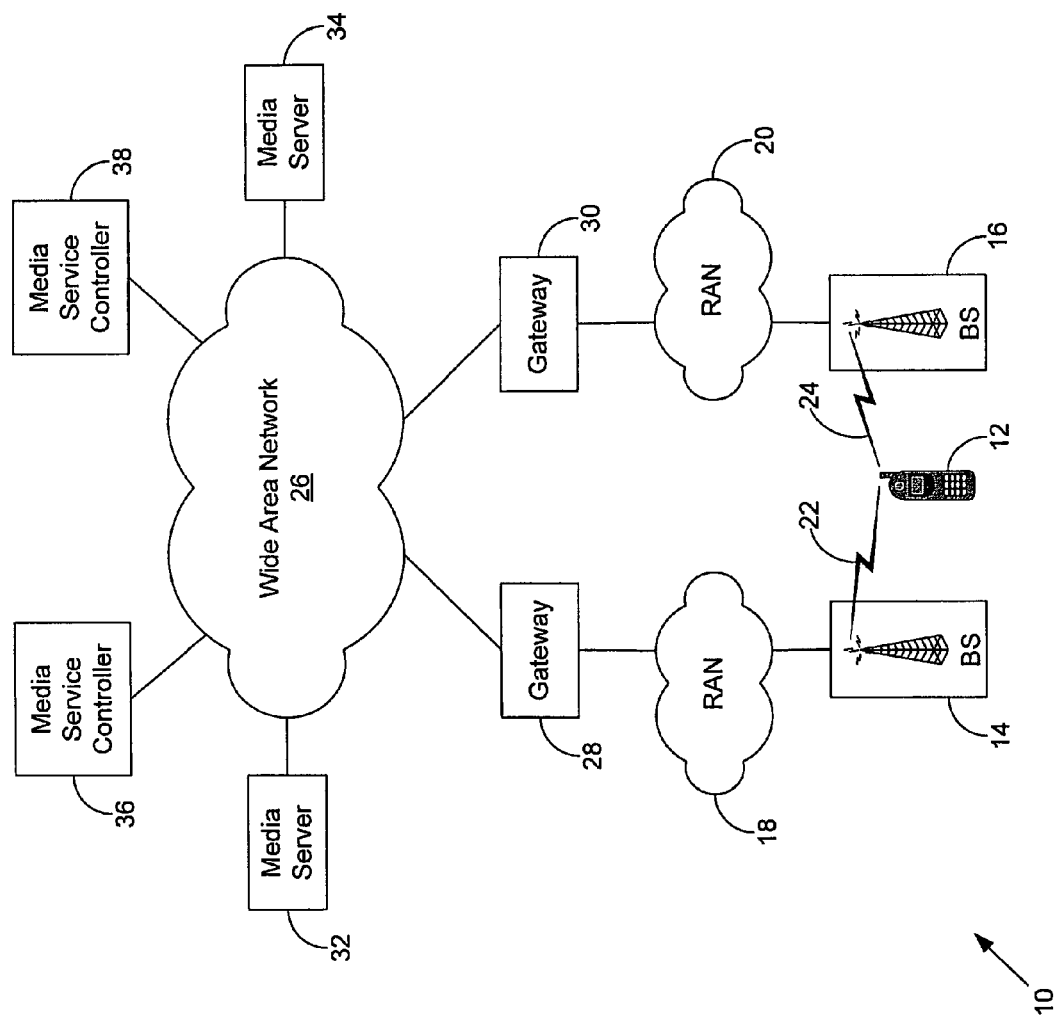
FIG. 1 is a block diagram of a wireless telecommunications network, in accordance with an exemplary embodiment.

The inventors have recognized that using a radio access network (RAN), such as a cellular wireless network, to deliver media content, such as streaming media content, to mobile stations can create significant demands on the RAN's resources, including air interface resources and backhaul resources.

One way of addressing the demands on air interface resources is to use multicast connections. For example, when multiple mobile stations are receiving the same media content from a base station, it may be more efficient for the base station to transmit the media content to the multiple mobile stations via a wireless multicast connection, rather than using wireless unicast connections to transmit the media content to each of the mobile stations individually. On the other hand, when only one mobile station is receiving the media content, it may be a more efficient use of air interface resources to transmit the media content via a wireless unicast connection instead of a wireless multicast connection.

One way of addressing the demands on backhaul resources is to use local sources of media content. For example, a media server may be associated with one or more base stations in a particular area. However, this approach can cause difficulties when a mobile station moves from an area associated with one media server to another area associated with another media server, for example, due to differences between the media content provided by the different media servers. Such differences may be particularly significant for media servers that are operated by different wireless service providers.

In order to manage the resources used to provide media content to mobile stations, the inventors propose the creation of a media service control function. The media service control function could be embodied in one or more network elements, such as media service controllers. Each media service controller may be associated with one or more base stations and one or more media servers. As described in more detail below, a media service controller may perform one or more of the following functions: (i) management of air interface resources (such as unicast, multicast, and broadcast resources) that are used to transmit media content to mobile stations, (ii) tracking of media content being provided by media servers, and (iii) control over the sourcing of media content received by a mobile station.

With respect to function (i), management of air interface resources, a media service controller may control how one or more base stations (e.g., the base stations of a given radio access network) transmit media content from one or more media servers to mobile stations. For example, the media service controller may control whether a mobile station receives content via a unicast connection or via a multicast connection of a base station. The determination may be based on how many mobile stations served by the same base station are receiving the same media content, e.g., a given "media channel" of streaming media content. If only one mobile station is receiving the media channel, then a unicast connection may be used. However, additional mobile stations may subsequently begin receiving the media channel, thereby using additional unicast connections of the base station. If the number of mobile stations receiving the same media channel becomes sufficiently high, the media service controller may instruct the base station to transmit the media channel to the mobile stations via a multicast connection instead of via multiple unicast connections. If, thereafter, the number of mobile stations receiving the media channel becomes sufficiently low, the media service controller may instruct the base station to transmit the media channel via one or more unicast connections instead of via the multicast connection.

Alternatively, the determination of whether to use a unicast connection or a multicast connection could be based on other factors. For example, a media service controller may pre-allocate multicast connections for media channels in accordance with a schedule. This approach may be advantageous when a particular program, such as a sporting event, is likely to be requested by a large number of mobile stations.

With respect to function (ii), tracking of media content, a media service controller may keep track of what media content is being provided by the one or more media servers with which the media service controller is associated. To perform this tracking function, the media service controller may receive periodic updates from its associated media servers and/or base stations. Alternatively, or additionally, the media service controller may send queries to its associated media servers and/or base stations. The information the media service controller obtains in this way may include, for each associated media server, an identification of each instance of media content currently being provided by the media server, an identification of each base station receiving each instance of media content, and whether unicast or multicast connections are being used for each instance of media content. The instance of media content could be, for example, a packet stream that provides the media content progressively. In that case, the media service controller may also be able to determine a current position in the packet stream, i.e., how much of the media content the media server has transmitted (or how much has been received).

A media service controller may keep track of media content in this way in order to support a content discovery service. A network element may use the content discovery service to determine what media content is available from the media servers associated with the media service controller. For example, a requesting media server that is not associated with the media service controller may be able to query the media service controller to determine whether any of its associated media servers are currently providing the same media content as the requesting media server. As described in more detail below, this content discovery service may be used to facilitate changing a source of media content received by a mobile station as the mobile station moves from one area to another.

With respect to function (iii), control over the sourcing of media content received by a mobile station, a media service controller may control which media server provides the media content to the mobile station. For example, the media service controller may switch from a first media server to a second media server when the mobile station moves from an area associated with the first media server to an area associated with the second media server. The transfer may be initiated by the first media server, for example, in response to the first media server receiving an indication of a new location of the mobile station. The new location may indicate to the first media server that the mobile station has moved out of (or is likely to move out of) the area associated with the first media server. For example, the new location may indicate that the mobile station has undergone a handoff (or is likely to undergo a handoff) from a first base station in the first media server's area to a second base station outside of the first media server's area.

In response to the indication, the first media server may use the content discovery service provided by the media service controller to determine whether any media server in the mobile station's new area is available to provide the media content that the first media server is currently providing to the mobile station. In response, the media service controller may determine that a second media server is currently providing, or would be able to provide, the same or similar media content via the second base station (i.e., the base station associated with the mobile station's new location). The media service controller may then respond with an identification of this media content being provided by the second media server. The identification could be, for example, in the form of a Universally Unique Identifier (UUID).

Based on this response, the first media server may send a join request to the media service controller requesting that the mobile station be joined to the identified instance of media content. If the media service controller determines that the mobile station is capable of being joined, the media service controller may send an acceptance message to the first media server and may instruct the second base station to transmit the media content from the second media server to the mobile station. The second base station may then begin transmitting the media content from the second media server to the mobile station, e.g., via a multicast connection of the second base station. In response to the acceptance message, the first media server may stop sending the media content to the mobile station. If the mobile station detects a content gap between the media content provided by the first media server and the media content provided by the second media server, the mobile station may send a retransmission request to the first media server. In response to the retransmission request, the first media server may send media content that makes up for the content gap, e.g., in a synchronization stream transmitted to the mobile station via a unicast connection of the second base station.

2. Exemplary Network Architecture

FIG. 1 illustrates an exemplary wireless telecommunications network 10, in which a mobile station 12 is able to communicate with base station 14 and/or base station 16 (e.g., depending on the location of mobile station 12) via an air interface. Mobile station 12 could be a wireless telephone, wireless personal digital assistant (PDA), wirelessly-equipped laptop computer, or other type of wireless communication device. The air interface communications between mobile station 12 and base stations 14 and 16 may be in accordance with a protocol, such as cdma2000, GSM/GPRS, UMTS, IEEE 802.16 ("WiMAX"), or other wireless communications protocol.

In the example illustrated in FIG. 1, base station 14 is connected to a radio access network (RAN) 18, and base station 16 is connected to RAN 20. Although FIG. 1 shows RAN 18 and RAN 20 each with only one base station, it is to be understood that RAN 18 and/or RAN 20 could be connected to a plurality of base stations. RAN 18 and RAN 20 might serve either separate or overlapping geographic areas. In addition, RAN 18 and RAN 20 could be operated by either the same wireless service provider or by different wireless service providers. In the example illustrated in FIG. 1, base station 14, connected to RAN 18, and base station 16, connected to RAN 20 serve different geographic areas. Thus, mobile station 12 may communicate with base station 14, via an air interface 22, when mobile station 12 is located in an area served by base station 14, and mobile station 12 may communicate with base station 16, via an air interface 24, when mobile station 12 is located in an area served by base station 16.

RANs 18 and 20 may provide access to other networks, such as wide area network 26. Wide area network 26 could be a packet-switched network that carries data in the form of packets. The data in each packet could correspond to voice, audio, video, or other type of content. In an exemplary embodiment, each packet includes a packet payload that contains the data and a packet header. The packet header may include various parameters that facilitate the routing and proper handling of the packet, e.g., in accordance with the Internet Protocol (IP), User Datagram Protocol (UDP), and/or Transmission Control Protocol (TCP). Thus, the packet header may include an IP address that corresponds to the source address of the packet, an IP address that corresponds to the destination address of the packet, as well as source and destination port numbers.

RANs 18 and 20 may be communicatively coupled to wide area network 26 via gateways 28 and 30. The configuration of gateways 28 and 30 may depend on the type of air interface communications supported by RANs 18 and 20. For example, in the case that RANs 18 and 20 support IEEE 802.16 protocols, gateways 28 and 30 may each be an access service network gateway (ASN-GW), and RANs 18 and 20 may each be an access service network (ASN). In the case that RANs 18 and 20 support cdma2000 protocols, gateways 28 and 30 may each be a packet data serving node (PDSN), and RANs 18 and 20 may include a respective base station controller (BSC) and packet control function (PCF). In some cases, RANs 18 and 20 may support different air interface protocols. For example, if mobile station 12 has multi-mode capability, mobile station 12 may communicate using one air interface protocol when served by RAN 18 and may communicate using a different air interface protocol when served by RAN 20.

Network 10 may enable mobile station 12 to communicate with other mobile stations, with landline stations, and with various types of servers. For example, network 10 may include media servers 32 and 34 with which mobile station 12 may communicate. Media servers 32 and 34 may be configured to provide media content to mobile stations, such as mobile station 12. Such media content may include audio and/or video content, such as music selections, movies, or television programming. Media servers 32 and 34 may provide their media content progressively in either a real-time or non real-time format.

In a real-time or "streaming" approach, a media server may transmit media content as a stream of packets, with each packet corresponding to a particular position in a time sequence. Such real-time communication of media content may make use of protocols such as the Real Time Streaming Protocol (RTSP), the Real-time Transport Protocol (RTP), and the Real-time Transport Control Protocol (RTCP). Relevant aspects of these protocols are described in the following documents, which are incorporated herein by reference: H. Schulzrinne et al., "Real Time Streaming Protocol (RTSP)," Request for Comments 2326, April 1998; H. Schulzrinne et al., "RTP: A Transport Protocol for Real-Time Applications," Request for Comments 3550, July 2003; J. Rey et al., "RTP Retransmission Payload Format," Request for Comments 4588, July 2006; and T. Einarsson et al., "Multiple aggregated control URIs for RTSP," Internet Draft, draft-einarsson-mmusic-rtsp-macuri-01, Dec. 21, 2006.

In a non real-time approach, a media server may transmit media content as a progressive download. Such progressive downloading may make use of protocols such as the HyperText Transfer Protocol (HTTP), File Transfer Protocol (FTP), and/or BitTorrent.

As shown in FIG. 1, media servers 32 and 34 could be connected to wide area network 26. In that configuration, the media content provided by media servers 32 and 34 would be carried through wide area network 26 in the form of packets, which would be delivered to a mobile station via a RAN. However, media servers and 32 and 34 could be located differently. For example, a media server could be connected to a RAN or to a base station, so as to provide media content to a mobile station via a local connection that does not go through wide area network 26.

Media servers 32 and 34 may each be associated with a particular geographic area, RAN, base station, or wireless service provider. For example, media server 32 may be associated with RAN 18, and media server 34 may be associated with RAN 20. With these associations, media server 32 may be used as a preferred source of media content when mobile station 12 is being served by RAN 18, and media server 34 may be used as a preferred source of media content when mobile station 12 is being served by RAN 20. Although FIG. 1 shows only two media servers, it is to be understood that network 10 may include a greater or fewer number of media servers. For example, a plurality of media servers may be associated with RAN 18, and a plurality of media servers may be associated with RAN 20.

Network 10 may also include media service controllers 36 and 38, which may support or control the provision of media content from media servers to mobile stations. Media service controllers 36 and 38 may each be associated with a particular geographic area, RAN, base station, wireless service provider, media server, or group of media servers. In an exemplary embodiment, media server 32 and media service controller 36 are associated with RAN 18, so that media service controller 36 controls the provision of media content from media server 32 to mobile stations served by RAN 18, and media server 34 and media service controller 38 are associated with RAN 20, so that media service controller 38 controls the provision of media content from media server 34 to mobile stations served by RAN 20. In an exemplary embodiment, communications to and from media service controllers 36 and 38 use the Message Primitives Format and Transport Protocol described in "WiMAX Forum Network Architecture," Stage 3, Release 1, Version 1.2, Jan. 11, 2008, which is incorporated herein by reference. However, other communication protocols could be used. Exemplary functions that may be provided by media service controllers 36 and 38 are described in more detail below.

As shown in FIG. 1, media service controllers 36 and 38 could be connected to wide area network 26. However, media service controllers 36 and 38 could be located differently. In addition, although FIG. 1 shows two media service controllers, network 10 may include a greater or fewer number. For example, one media service controller may control the provision of media content from both media servers 32 and 34 through both RANs 18 and 20.

3. Exemplary Methods for Changing a Mobile Station's Connection to a Base Station One function of a media service controller may be controlling how unicast, multicast, and broadcast resources of one or more base stations are used to transmit media content to mobile stations. For purposes of illustrating this function, FIGS. 2 and 3 illustrate examples in which a base station (BS), such as base station 16, communicates with a subscriber station (SS), such as mobile station 12, using IEEE 802.16 protocols.

In accordance with IEEE 802.16 protocols, a base station may transmit packets to a mobile station using a unicast, multicast, or broadcast transport connection. Packets transmitted over a unicast transport connection are received by only one mobile station. Packets transmitted over a multicast transport connection are received by multiple mobile stations. Packets transmitted over a broadcast transport connection are received by all of the mobile stations being served by the base station.

A packet classifier in the base station maps packets to transport connections based, for example, on information contained in the packet headers. For example, when a base station receives a packet with a destination IP address that corresponds to a mobile station, the packet classifier may map that packet to a transport connection that goes to that mobile station. As described in more detail below, the transport connections and packet classifiers used by a base station may be controlled by a media service controller. More particularly, a media service controller may send instructions to a base station that cause the base station to change which transport connections and/or packet classifiers are used to convey media content to mobile stations.

Figure 2:
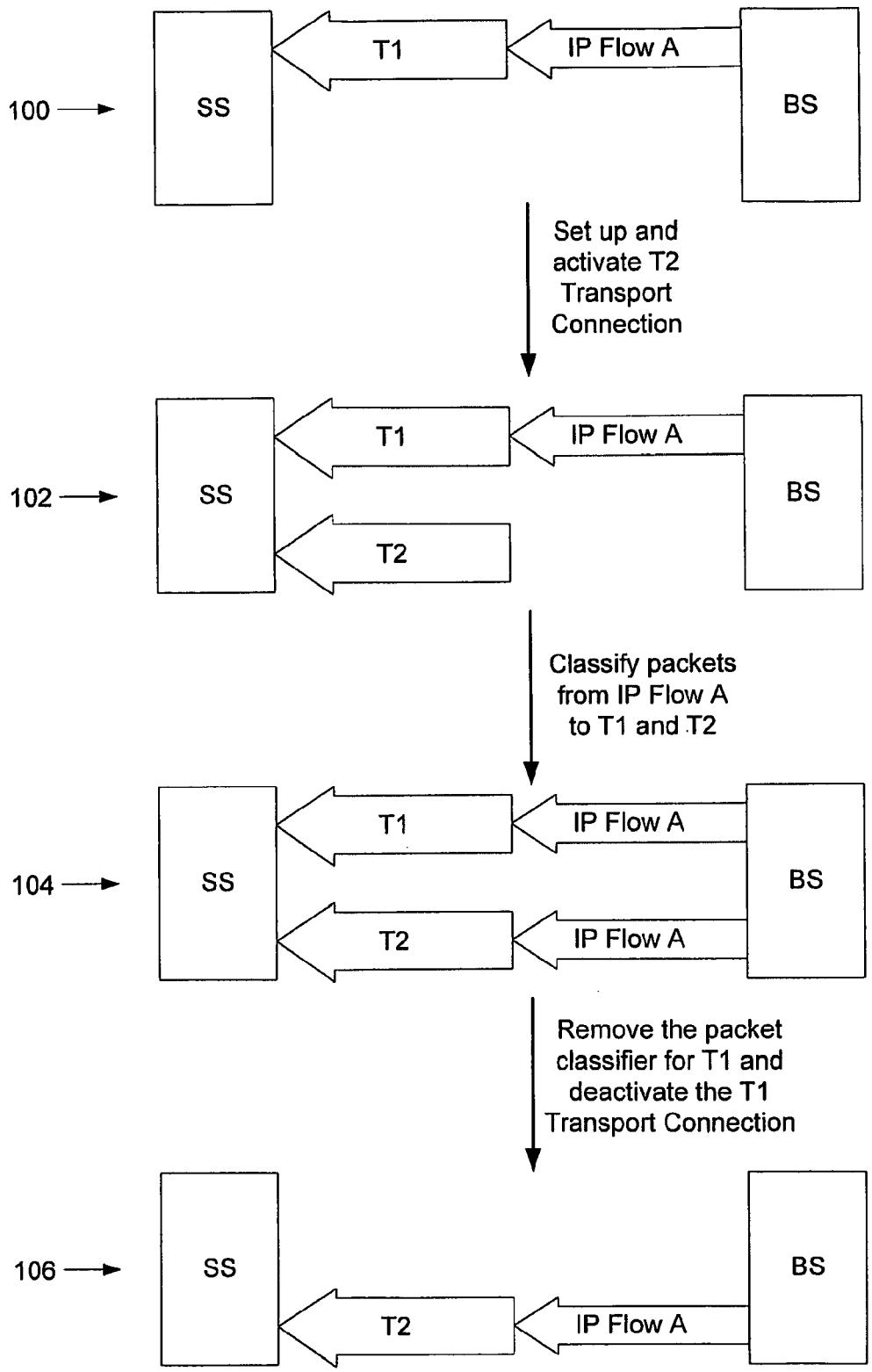
FIG. 2 is a schematic diagram illustrating a method of switching transport connections, in accordance with an exemplary embodiment.
Figure 3:
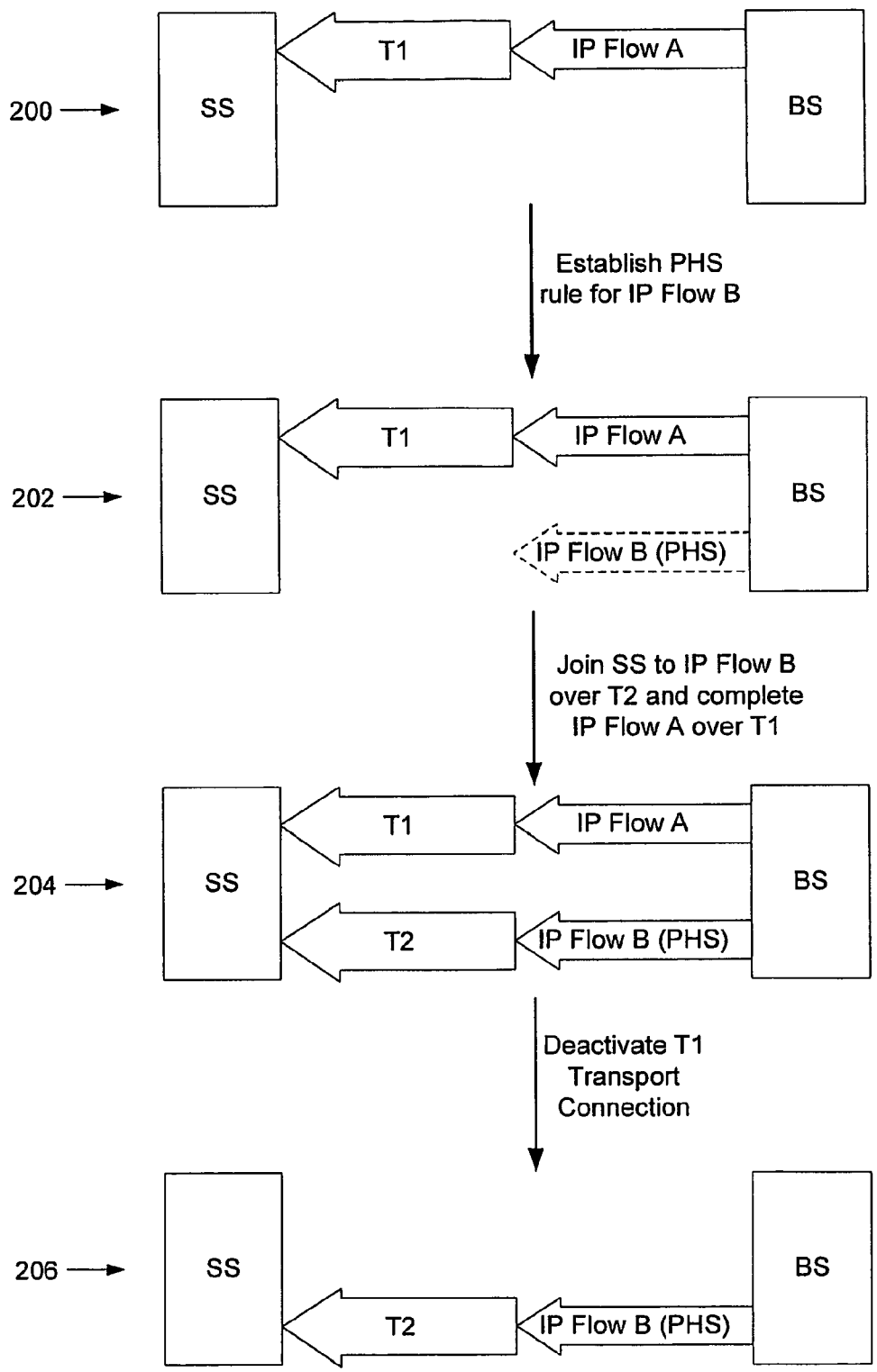
FIG. 3 is a schematic diagram illustrating a method of switching IP packet flows and transport connections, in accordance with an exemplary embodiment.

FIG. 2 illustrates an example in which a media service controller instructs a base station to change a mobile station's connection from a unicast transport connection to a multicast transport connection. The example begins with the base station (BS) transmitting IP Flow A via unicast transport connection (T1) to the subscriber station (SS), as indicated by configuration 100. With reference to FIG. 1, the base station could be base station 14, the subscriber station could be mobile station 12, and IP Flow A could be a flow of packets from media server 32 containing media content, such as audio or video content. Thus, in configuration 100, an initial packet classifier in the base station maps the packets in IP Flow A to transport connection T1 based, for example, on the source and/or destination IP addresses in the headers of the packets.

At some point, the base station receives a multicasting instruction from a media service controller (e.g., from media service controller 36) that instructs the base station to use a multicast transport connection to transmit the media content. The media service controller may send the multicasting instruction in order to implement a schedule (e.g., multicast transport connections may be pre-allocated for certain media content for certain times and/or areas). Alternatively, the media service controller may send the multicasting instruction in response to a determination that a sufficient number of mobile stations being served by the mobile station are receiving the same media content. The media service controller may determine this based on notifications sent by the media server providing the media content or by periodically querying the media server.

In response to the multicasting instruction, the base station sets up and activates a multicast transport connection (T2) to the subscriber station, as indicated by configuration 102. The base station also creates an additional packet classifier that maps the packets in IP Flow A to transport connection T2. Thus, there may be a transitional period during which packets from IP Flow A are being mapped to transport connection T2 but packets from IP Flow A that were mapped to transport connection T1 are still being transmitted to the subscriber station, as indicated by configuration 104. When transmission of the packets mapped to transport connection T1 is complete, the base station may remove the initial packet classifier and may deactivate transport connection T1, as indicated by configuration 106.

In this way, a mobile station receiving media content via a unicast connection may be migrated to a multicast connection when the multicast connection is deemed more efficient (e.g., when other mobile stations are receiving the same media content). Subsequently, a unicast connection may be deemed more efficient, for example, because the other mobile stations have stopped receiving the media content. When that situation occurs, the media service controller may send a unicasting instruction to the base station. In response, the base station may migrate the mobile station from the multicast connection to a unicast connection.

FIG. 3 illustrates an example in which a media service controller instructs a base station to change a mobile station's connection from a unicast transport connection to a multicast transport connection and also to change the source of the media content received by the mobile station. The example begins with the base station (BS) transmitting IP Flow A via unicast transport connection T1 to the subscriber station (SS), as indicated by configuration 200. While the base station is transmitting IP Flow A to the subscriber station via transport connection T1, the base station may also be transmitting IP Flow B to other subscriber stations via a multicast transport connection (T2). With reference to FIG. 1, the base station could be base station 16, the subscriber station could be mobile station 12, IP Flow A could be a flow of packets from media server 32 containing media content (e.g., audio or video content) and IP Flow B could be a flow of packets from media server 34 containing the same or similar media content. Thus, in configuration 200, a first packet classifier in the base station maps the packets in IP Flow A to transport connection T1, and a second packet classifier in the base station maps the packets in IP Flow B to transport connection T2.

At some point, the base station receives a join instruction from a media service controller (e.g., from media service controller 38) that instructs the base station to join the subscriber station to IP Flow B being transmitted over transport connection T2. The media service controller may send the join instruction because IP Flow B may originate from a preferred source of media content. For example, mobile station 12 may have moved from base station 14, where media server 32 transmitting IP Flow A is a preferred source of media content, to base station 16, where media server 34 transmitting IP Flow B is a preferred source of media content. These preferences may result from different media servers being associated with different base stations, e.g., based on geographic proximity, different wireless service providers, or other factors.

In response to the join instruction, the base station may communicate with the subscriber station to establish a packet header suppression (PHS) rule for IP Flow B, as indicated by configuration 202. The PHS rule may associate a packet header suppression index with one or more parameters in the packet headers in IP Flow A, such as source IP address and/or destination IP address.

Once the PHS rule has been established, the base station may join the subscriber station to transport connection T2 and may associate the PHS rule with the second packet classifier. As a result, the second packet classifier maps the packets in IP Flow B to transport connection T2, and the PHS rule is applied to the packets. At this stage, the subscriber station receives IP Flow B (in packet-header suppressed form) via transport connection T2 and may continue to receive IP Flow A over transport connection T1, as indicated by configuration 204.

In accordance with the PHS rule, the subscriber station may generate reconstructed packets from the packet-header suppressed packets in IP Flow B by replacing the packet header suppression index with its associated packet header parameters from IP Flow A. In this way, the packets that the subscriber station receives from IP Flow B may appear to be part of IP Flow A. Further, because the subscriber station may still be receiving packets from IP Flow A over transport connection T1, the subscriber station may detect duplicate packets that may appear to be part of IP Flow A. In that case, the media client in the subscriber station that processes the media content contained in the packets may simply disregard the duplicate packets.

At some point, IP Flow A may stop, in which case the base station may deactivate transport connection T1, as indicated by configuration 206. The subscriber station would then receive the media content only through IP Flow B. However, because of the PHS rule, the packets in IP Flow B may appear to be part of IP Flow A. Thus, the origin of the media content received by the subscriber station may be changed in a manner that appears seamless to the subscriber station.

Nonetheless, there may be differences between the media content provided in IP Flow A and the media content provided in IP Flow B. For example, in the case of a television program, there may be a slight time difference between the audio/video content contained in IP Flow A and the audio/video content contained in IP Flow B. If IP Flow B is behind IP Flow A, then IP Flow B may provide media content that the subscriber station already received from IP Flow A. To address this issue (until IP Flow A stops), the subscriber station may simply disregard duplicate packets. However, if IP Flow B is ahead of IP Flow A, the subscriber station may detect a content gap when IP Flow A stops. To make up for the content gap, a unicast transport connection may be activated temporarily to transmit a stream of synchronization packets to the subscriber station. The synchronization packets may contain the media content needed to fill in the content gap. The synchronization packets could be sent automatically or in response to a retransmission request from the subscriber station.

Figure 4:
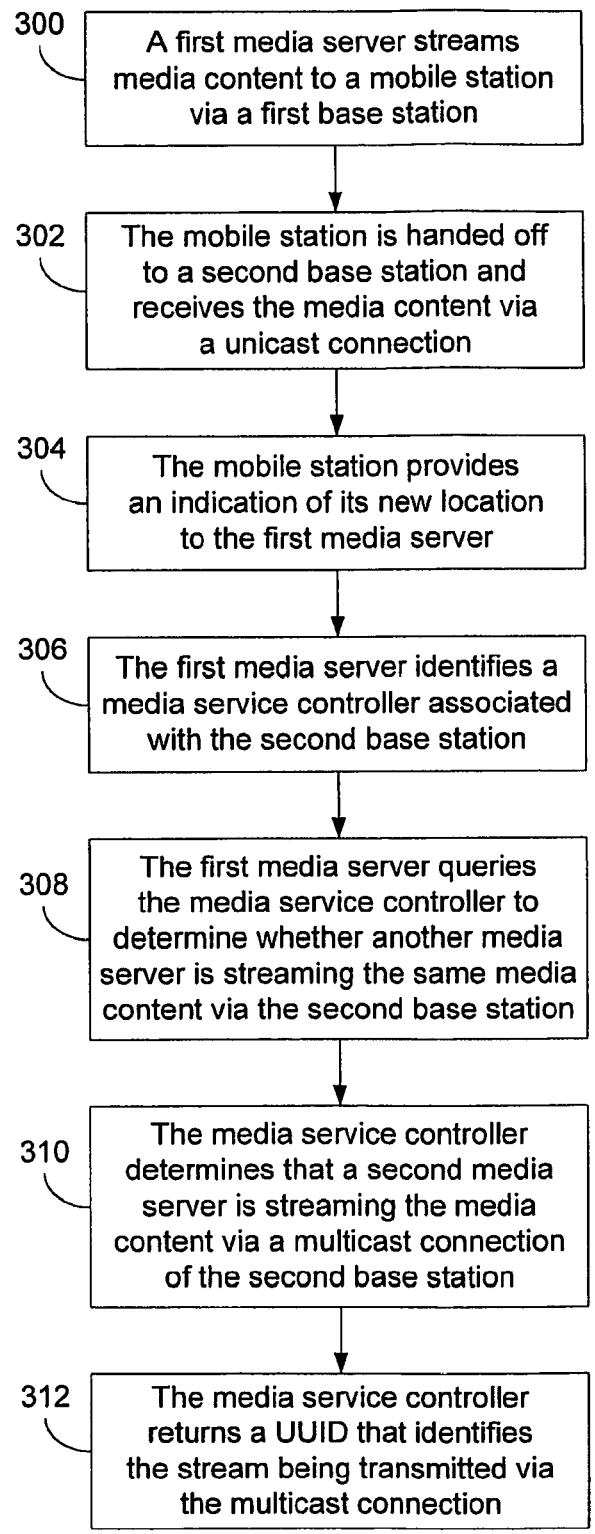
FIG. 4 is a flow chart illustrating a method of using a content discovery service, in accordance with an exemplary embodiment.
Figure 5:
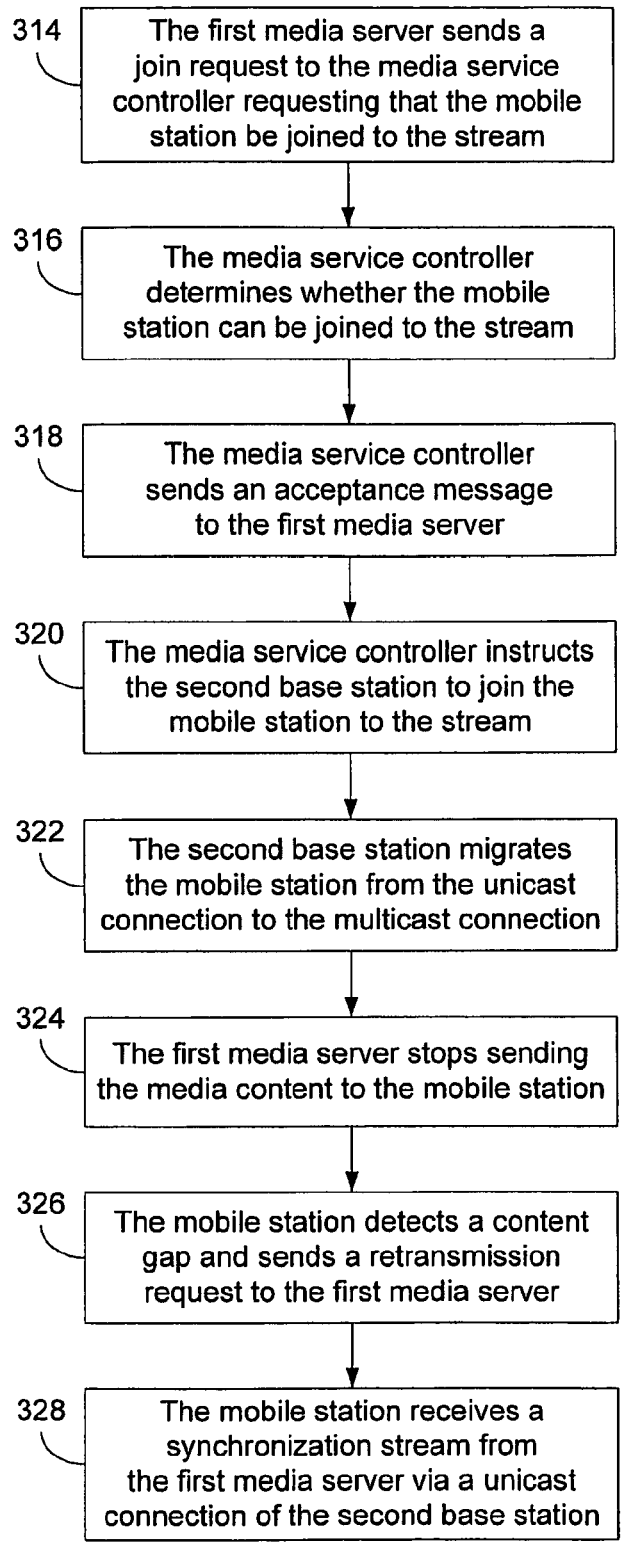
FIG. 5 is a flow chart illustrating a method for joining a mobile station to a stream of media content, in accordance with an exemplary embodiment.

4. Exemplary Methods for Changing a Source of Media Content Received by a Mobile Station As noted above for FIG. 3, the source of media content received by a mobile station may change when the mobile station moves from one base station to another. FIGS. 4 and 5 illustrate an example of this process in more detail. FIG. 4 illustrates a first phase of the process, in which a first media server that initially provides media content to the mobile station via a first base station determines, by using a media service controller's content discovery service, that a second media server is available to provide the media content to the mobile station via a second base station. FIG. 5 illustrates a second phase of this process, in which the mobile station is joined to a multicast connection of the second base station that is already being used to transmit the media content from the second media server. FIGS. 4 and 5 are described with reference to wireless telecommunications network 10, as illustrated in FIG. 1. It is to be understood, however, that other network architectures could be used. Further, although FIGS. 4 and 5 are directed to an example in which the media content is streamed (i.e., provided in a real-time format), a similar process could be used when the media content is provided in other ways (e.g., in a progressive download).

With reference FIG. 4, the process may begin with a first media server (e.g., media server 32) streaming media content to a mobile station (e.g., mobile station 12) via a first base station (e.g., via base station 14), as indicated by block 300. At some point, the mobile station is handed off to a second base station and begins receiving the media content from the first media server via a unicast connection of the second base station (e.g., base station 16), as indicated by block 302. The handoff may occur as a result of the mobile station moving from an area served by the first base station to an area served by the second base station.

Because of this handoff, the mobile station provides an indication of its new location to the first media server, as indicated by block 304. The mobile station may provide this indication either before or after the handoff has been completed. In an exemplary embodiment, the mobile station provides the location indication by sending the first media server a source description packet containing a "LOC" (geographic user location) item, in accordance with the Real-time Transport Control Protocol (RTCP). It is to be understood, however, that the mobile station could use other methods to send its location to the first media server.

The information provided in the mobile station's location indication could include an identifier of the second base station and/or an identifier of the wireless service provider operating the second base station. Alternatively or additionally, the mobile station could indicate its location in terms of latitude/longitude or in other ways.

In response to the new location indicated by the mobile station, the first media server identifies a media service controller that is associated with the second base station, as indicated by block 306. To identify the media service controller associated with the second base station, the first media server may perform a look-up in either an internal database or an external database (e.g., a DNS server), using the location information provided by the mobile station.

The first media server then queries the identified media service controller (e.g., media service controller 38) to determine whether another media server is streaming the same media content via the second base station, as indicated by block 308. The query may include (i) an identification of the media content that the first media server is currently providing to the mobile station and (ii) an identification of the second base station. The query may also include other information.

In response to this query, the media service controller determines that a second media server (e.g., media server 34) is currently streaming the same media content via a multicast connection of the second base station, as indicated by block 310. The media service controller then sends a response that includes an identifier, such as a Universally Unique Identifier (UUID), that identifies the stream being transmitted via the multicast connection, as indicated by block 312. The response from the media service controller may also include other information, such as the second media server's position in the stream.

Thus, in the example illustrated in FIG. 4, the response from the media service controller indicates an opportunity to join the mobile station to a stream that is already providing the media content via a multicast connection. The process for joining the mobile station is described in more detail below with reference to FIG. 5. However, it is to be understood that the media service controller may respond with a UUID even when the second base station is not currently transmitting the media content via a multicast connection. For example, it may be sufficient when only a unicast connection of the second base station is being used or when the second base station is not currently transmitting the media content at all but the media content is, nonetheless, available from the second media server.

Furthermore, in some cases, the second media server may not be able to provide the same media content as the first media server. Thus, the response from the media service controller could indicate that there is no opportunity to provide the media content to the mobile station from another media server. In that situation, the first media server may continue providing the media content to the mobile station via the unicast connection of the second base station. However, the first media server may query the content discovery service of the media service controller to determine what other media content is available from the second media server and then make those options known to the mobile station.

FIG. 5 illustrates an example in which the mobile station is joined to the stream from the second media server that is being transmitted via the multicast connection of the second base station, i.e., joined to the stream identified in block 312 of FIG. 4. The joining process may begin when the first media server sends a join request to the media service controller requesting that the mobile station be joined to the stream, as indicated by block 314. The join request may include: (i) the UUID provided by the media service controller; (ii) an identification of the mobile station; and (iii) an indication of the first media server's current position in the stream being provided to the mobile station. The join request may also include other information, such as the buffer size and current buffer capacity of the media client in the mobile station and the first media terminal's ability to provide a synchronization stream to make up for any content gap that may arise from switching to the second media server.

In response to the join request, the media service controller determines whether the mobile station can be joined to the stream, as indicated by block 316. To make this determination, the media service controller may determine the mobile station's device capabilities to determine whether the mobile station is capable of accepting the multicast connection. For example, the media service controller may query a device capabilities database. Alternatively, if the mobile station is using IEEE 802.16 to communicate with the second base station, then Station Basic Capabilities (SBC) information may have been passed to the ASN-GW during connection establishment. Thus, the media service controller may be able to query the ASN-GW to determine the mobile station's capabilities.

The media service controller may also consider the positions of the first media server and the second media server in their respective streams. If the second media server is ahead, then the media service controller may determine whether the first media server will be able to provide a synchronization stream to make up for the resulting content gap.

If the mobile station can be joined to the second media server's stream, the media service controller sends an acceptance message to the first media server, as indicated by block 318. The media service controller also sends the second base station a join instruction that instructs the second base station to join the mobile station to the stream, as indicated by block 320. The join instruction may identify the stream, the mobile station, and the multicast connection.

In response to the join instruction, the second base station migrates the mobile station from the unicast connection to the multicast connection, as indicated by block 322. The second base station may change the mobile station's connectivity in the manner described above for FIG. 3. In particular, the second base station may use packet header suppression (PHS) so that the packets from the second media server appear to originate from the first media server.

At some point after receiving the acceptance message, the first media server stops sending the media content to the mobile station, as indicated by block 324. If the mobile station detects a content gap, the mobile station sends a retransmission request to the first media server, as indicated by block 326. In response, the first media server sends a synchronization stream that makes up for the content gap, which the mobile station receives via a unicast connection of the second base station, as indicated by block 328.

In this way, the source of the media content being received by the mobile station may be changed from the first media server to the second media server. However, the change may be made "transparent" to the mobile station by applying a PHS rule to the packets from the second media server. In addition, even after receiving the media content from the second media server, the mobile station may still communicate with the first media server in order to change the provision of media content.

For example, the mobile station may depart from the stream provided by the second media server, by sending an RTSP TEARDOWN request to the first media server. The first media server would then communicate with the media service controller, and the media service controller would, in turn, instruct the second base station to remove the mobile station from the multicast connection.

As another example, the mobile station may request different media content (i.e., change the media channel that it is receiving) by sending an RTSP PLAY request to the first media server. The first media server would then communicate this request to the media service controller. If the requested media content is available from the second media server, the media service controller may instruct the second base station to migrate the mobile station to a different multicast connection to receive the media content. If the requested media content is not available from the second media server, the media service controller may instruct the second base station to migrate the mobile station to a unicast connection to allow the mobile station to receive the media content from the first media server.

5. Conclusion

Exemplary embodiments of the present invention have been described above. Those skilled in the art will understand, however, that changes and modifications may be made to these embodiments without departing from the true scope and spirit of the invention, which is defined by the claims.

What is claimed is:

1. A method for changing a source of media content received by a mobile station, said method comprising:
providing said media content to said mobile station from a first media server via a first base station;
said first media server receiving an indication of a new location of said mobile station, wherein said new location is associated with a second base station;
in response to said indication, said first media server sending a content discovery request to a media service controller to determine whether another media server is available to provide said media content via said second base station, said content discovery request identifying said media content and said second base station;
said media service controller determining that a second media server is available to provide said media content to said mobile station; and
said media service controller instructing said second base station to transmit said media content from said second media server to said mobile station.

2. The method of claim 1, further comprising:
effecting a handoff of said mobile station from said first base station to said second base station; and
after said handoff, said mobile station receiving said media content from said second media server via said second base station.

3. The method of claim 2, wherein said mobile station receiving said media content from said second media server via said second base station comprises:
said mobile station receiving said media content via a unicast connection of said second base station.

4. The method of claim 1, further comprising:
providing said media content to said mobile station from said second media server via said second base station.

5. The method of claim 4, wherein providing said media content to said mobile station from said second media server via said second base station comprises:
said second base station transmitting said media content from said second media server to said mobile station via a multicast connection.

6. The method of claim 5, wherein said multicast connection is an IEEE 802.16 transport connection.

7. The method of claim 5, wherein said media service controller determining that a second media server is available to provide said media content to said mobile station comprises:
said media service controller determining that said second base station is currently transmitting said media content from said second media server via said multicast connection.

8. The method of claim 7, wherein said media service controller instructing said second base station to transmit said media content from said second media server to said mobile station comprises:
said media service controller instructing said second base station to join said mobile station to said multicast connection.

9. The method of claim 1, wherein providing said media content to said mobile station from a first media server via a first base station comprises:
said first media server transmitting a first stream that provides said media content progressively.

10. The method of claim 9, wherein said content discovery request further identifies a current position in said first stream, said current position corresponding to a portion of said media content currently being provided by said first media server.

11. The method of claim 1, further comprising:
in response to said content discovery request,
(a) said media service controller determining that said media content is being transmitted by said second media server via said second base station in a second stream; and
(b) said media service controller sending a content discovery response to said first media server, said content discovery response including an identification of said second stream.

12. The method of claim 11, wherein said content discovery response further identifies a second current position in said second stream, said second current position corresponding to a portion of said media content currently being provided by said second media server.

13. The method of claim 12, wherein said media content is being provided to said mobile station by said first media server in a first stream, further comprising said first media server sending a join request to said media service controller, wherein said join request requests joining said mobile station to said second stream and identifies a first current position in said first steam, said first current position corresponding to a portion of said media content currently being provided by said first media server.

14. The method of claim 13, further comprising:
in response to said join request,
(a) said media service controller determining that said mobile station can be joined to said second stream;
(b) said media service controller sending an acceptance message to said first media server; and
(c) said media service controller instructing said second base station to transmit said second stream to said mobile station.

15. The method of claim 14, wherein said second stream is being transmitted by said second base station via a multicast connection, and wherein said media service controller determining that said mobile station can be joined to said second stream comprises:
said media service controller determining that said mobile station is capable of accepting said multicast connection.

16. The method of claim 14, wherein said media service controller determining that said mobile station can be joined to said second stream comprises:
said media service controller comparing said first current position in said first stream with said second current position in said second stream; and
if said second current position is ahead of said first current position, said media service controller determining that said first media server will be able to make up for any content gap caused by a difference between said first current position and said second current position.

17. The method of claim 14, further comprising:
in response to said acceptance message, said first media server ending transmission of said first stream to said mobile station.

18. The method of claim 17, further comprising:
joining said mobile station to a multicast connection of said second base station; and
said mobile station receiving said second stream via said multicast connection.

19. The method of claim 18, further comprising:
after said first media server has ended transmission of said first stream, said mobile station detecting a content gap between said first stream and second stream;
in response to detecting said content gap, said mobile station sending a retransmission request to said first media server;
in response to said retransmission request, said first media server transmitting a synchronization stream, wherein said synchronization stream provides media content to make up for said content gap; and
said mobile station receiving said synchronization stream via a unicast connection of said second base station.

\* \* \* \* \*